July 27, 1971 L. G. FISCHER ET AL 3,595,680
MACHINE AND METHOD FOR COATING FOOD PRODUCTS
Filed May 8, 1969     2 Sheets-Sheet 1
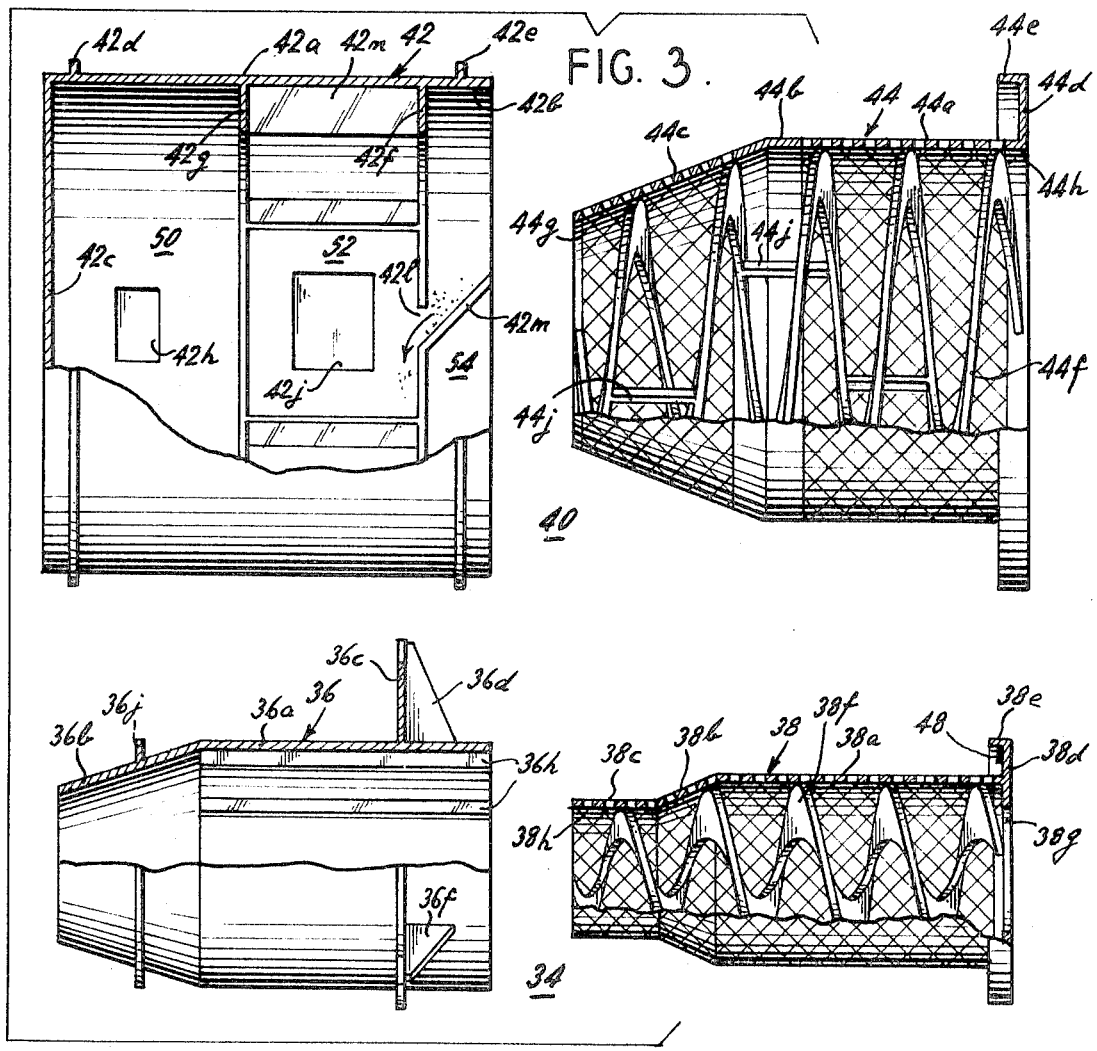
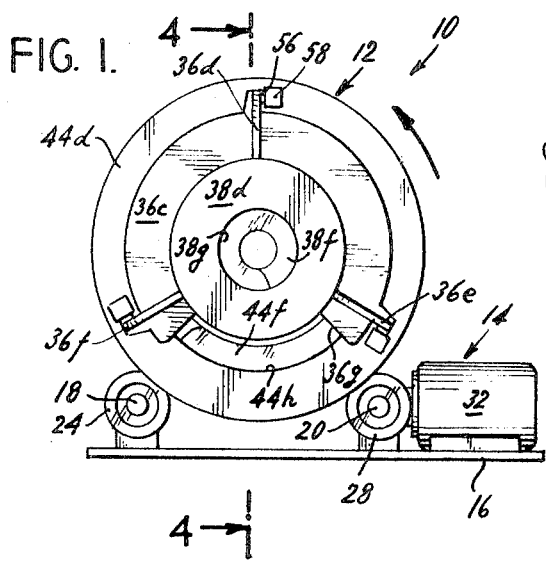
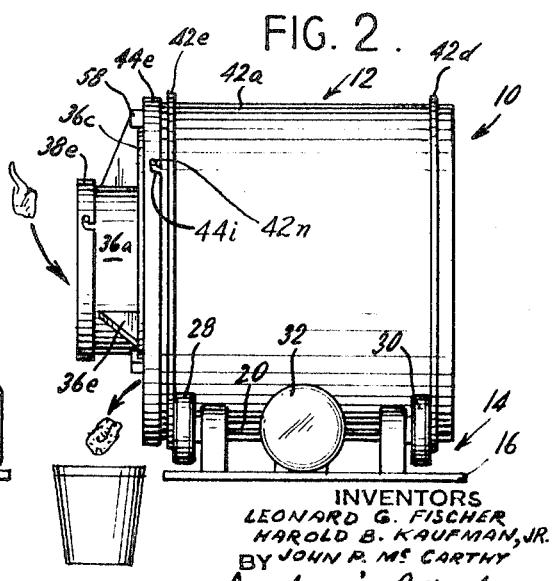
INVENTORS
LEONARD G. FISCHER
HAROLD B. KAUFMAN, JR.
BY JOHN P. McCARTHY
Amster & Rothstein
ATTORNEYS United States Patent Office 3,595,680
Patented July 27, 1971

3,595,680
MACHINE AND METHOD FOR COATING
FOOD PRODUCTS
Leonard G. Fischer, College Point, Harold B. Kaufman, Jr., New York, and John P. McCarthy, College Point, N.Y., assignors to DCA Food Industries, Inc., New York, N.Y.
Filed May 8, 1969, Ser. No. 822,946
Int. Cl. A23b 1/10
U.S. Cl. 99—166
33 Claims

ABSTRACT OF THE DISCLOSURE

A machine and method for battering and then breading food products wherein the machine comprises a rotary drum which includes a battering unit and a breading unit arranged coaxially with each other, with the input end of the battering unit and the output end of the breading unit being arranged at the same end of the rotary drum, such that the feed of the food product and the delivery of the battered and breaded food product is at the same end of the drum and wherein the rotary drum turns about a drum axis to progressively advance the food product through the battering unit and then through the breading unit.

---

The present invention relates generally to the wetting and coating of food products, and in particular to an improved machine and method for battering and breading food products such as chicken, fish, shrimp, scallops, clams, onion rings and the like.

A wide variety of techniques and related apparatus have been suggested for the wetting of food products with a conventional batter such as egg and milk wash or water, followed by coating or breading thereof with bread crumbs, crackermeal, flour or mixtures thereof. Often, the mass processing of pieces of fowl, meat, fish, vegetables and the like is accomplished by dipping the food product by hand into the batter or wash to wet all of the surfaces thereof, followed by the breading thereof, likewise by hand. Also, equipments have been devised for feeding the food product along a conveyor system where it is covered with batter, followed by the feeding of the batter-coated food products onto a further conveyor system for breading. Still other systems have been suggested wherein the food products are pre-battered by hand and then placed in a drum or hopper for breading the batter-coated surfaces.

There exists a need for an improved battering and breading method and apparatus for the practice of the method wherein food products of various kinds and shapes may be automatically wetted with a required batter, followed by the coating of the wetted surfaces with breading or similar particulate coating materials. Such method and apparatus should be suitable for mass production at low unit cost, require minimal handling by an operator, produce a uniformly coated food product and be capable of operation over long periods of time without the need for cleaning or other servicing. In particular, the equipment should avoid the carry-over of excess batter from the battering station or location thereof to the breading station or location. Such carry-over obviously manifests itself as fouling of the equipment and/or pilling of the particulate coating material and results in undesirable processing conditions and lack of uniform quality or unacceptable quality in the final food product.

It is an object of the present invention to provide an improved food-coating machine and method which realizes one or more of the aforesaid objectives. Specifically, it is within the contemplation of the present invention to provide a machine and method for battering and breading food products which is capable of achieving substantially automatic operation, produces a highly uniform and quality end-product, and is capable of operation over prolonged periods of time without the need for servicing and cleaning.

In accordance with apparatus aspects of the present invention, there is provided a machine for coating food products which comprises a rotary drum which is mounted for rotation about a drum axis. The drum includes a battering section, a first feeder for feeding food products through the battering section, a coating section, a second feeder for feeding food products through the coating section and means for transferring the battered food products from the battering section to the coating section. Preferably, the input end of the battering section and the output end of the coating section are at the same end of the drum such that the machine can be attended by an operator standing at a single operator location, with the machine itself being of comparatively short length such that it takes up little floor space.

In accordance with method aspects of the present invention, there is provided a method for coating food products which includes the steps of feeding the food products through a battering zone while rotating the food products to coat substantially all surfaces thereof, passing the food products beyond the battering zone to establish a dripping zone wherein excess batter drips off of the food products, dropping the food products through a free-fall zone to shake off excess batter and then feeding the battered food products through a coating zone while rotating the battered food products to apply a particulate coating thereto.

The above brief description as well as other objects, features and advantages of the present invention will be more fully appreciated by reference to the following detailed description of a presently preferred, but nonetheless illustrative embodiment of a machine constructed in accordance with the present invention, when taken in conjunction with the accompanying drawings, wherein:

FIG. 1 is a front elevational view of the battering and breading machine demonstrating features of the present invention;

FIG. 2 is a side elevational view of the machine showing a food product entering the input end of the battering unit and the egress of a battered and breaded product from the output end of the breading unit;

FIG. 3 is an exploded elevational view, with parts broken away and shown in section, illustrating in the top half thereof the outer drum body and the foraminous outer guide member of the breading section and in the lower half thereof the inner drum body and foraminous inner guide member of the battering unit;

Figure 6:
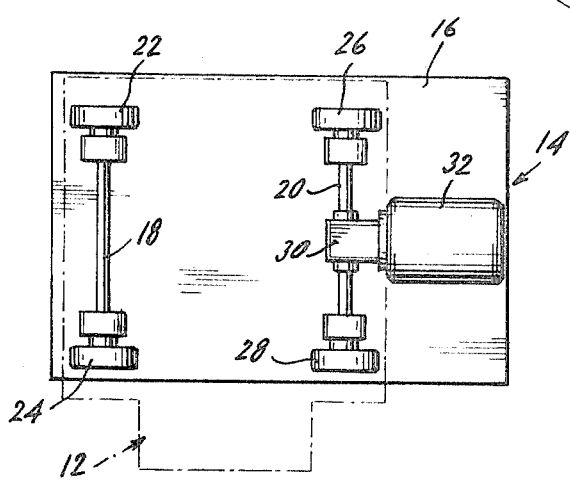
FIG. 6 is a planned view of the combined base and drum drive, with the drum position shown by the dot-dash lines.

Referring now to FIG. 1, there is shown a combined battering and breading machine, generally designated by the reference numeral 10, which includes a rotary food-processing drum 12 which is mounted for rotation about a substantially horizontal drum axis on a combined base and drum drive 14. The base and drum drive, which is seen by itself in FIG. 6, includes a base 16 on which is journaled spaced-apart idler and drive shafts 18, 20, with the idler shaft 18 carrying idler rollers 22, 24 and the drive shaft 20 carrying drive rollers 26, 28. Drive shaft 20 is connected through a right-angle reduction gear unit 30 to a drive motor 32. As seen in FIG. 1, the spaced idler rollers 22, 24 and the drive rollers 26, 28 cooperate to define a cradle upon which the drum 12 is mounted for rotation, with the illustrated direction of rotation being counterclockwise when viewed from the front (FIG. 1).

In a typical machine for battering and breading food products, such as chicken, fish pieces, seafood and the like, the drive motor 32 turns the drum 12 approximately 10 to 12 revolutions per minute. Although reference will be made throughout the specification to "battering," it is intended that this expression be construed as including conventional batters used in the preparation of a variety of food products such as washes of egg and milk and, indeed, even water washes. Further, the expression "breading" is intended to embrace bread crumbs, crackermeal, flour, mixtures thereof, and, indeed, any particulate eatable food coating.

The rotary drum 12 includes four concentric structures which defined a central and axially extending battering unit 34 and a surrounding and coaxial breading unit 40. As seen at the lower portion of FIG. 3, the battering unit 34 includes an inner drum body 36 and a foraminous inner guide member 38 which is adapted to be mounted therein (see FIG. 4), while the breading unit 40 includes an outer drum body 42 and a foraminous inner guide member 44 mounted therein (see FIG. 4).

Considering first the battering unit 34, the inner drum body 36 is seen to include a cylindrical section 36a which includes at one end thereof a conical section or extension 36b. Projecting radially and outwardly from the cylindrical section 36a is a mounting flange 36c which is reinforced at circumferentially spaced locations by three radially extending ribs, 36d, 36e, 36f (see FIG. 1). A substantial portion of the circumferential extent of the mounting flange 36c between ribs 36e, 36f is cut away (see FIG. 1) to provide an exit opening 36g for the battered and breaded food products, as will be subsequently described. Additionally, the inner drum body 36 includes a circumferentially extending radial flange 36j which assists in mounting the inner drum body 36 within the guide member 44 of the breading unit 40.

Typically and preferably the four coaxial components of the drum 12 are fabricated of welded plastic components since this provides a lightweight, low cost and easily-welded construction which is easy to clean. Several of the components including the inner drum body 36 and the outer drum body 42 are fabricated of a more rigid plastic such as linear polyethylene while other of the components including the foraminous inner guide member 38 and the outer guide member 44 are fabricated of a conventional polyethylene, in whole or in part, to impart the necessary flexibility thereto.

Figure 4:
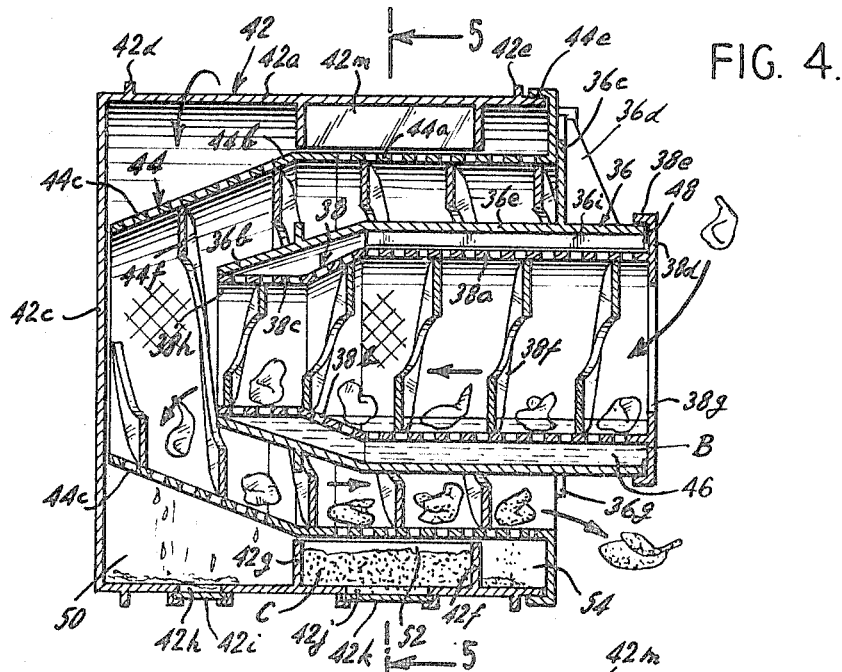
FIG. 4 is a sectional view, on an enlarged scale, taken substantially along the line 4—4 of FIG. 1 and looking in the direction of the arrows.
Figure 5:
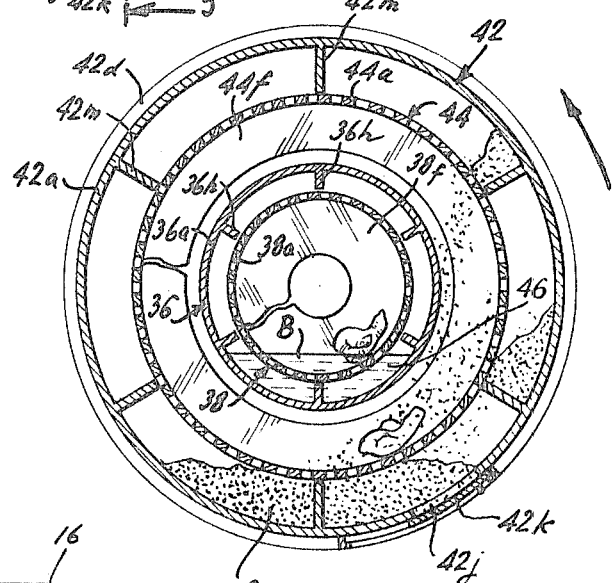
FIG. 5 is a sectional view taken substantially along the line 5—5 of FIG. 4.

The inner drum body 36 receives the inner guide member 38 and cooperates therewith to define an annular batter reservoir therebetween, seen best in FIGS. 4 and 5 and designated by the numeral 46. With continued reference to FIG. 3, the inner guide member 38 is seen to include a cylindrical section 38a which is substantially coextensive with the cylindrical section 36a, an intermediate conical section 38b and a further smaller diameter cylindrical section 38c, with the sections 38b, 38c being substantially coextensive with the conical section 36b (see FIG. 4). Near its free end, the large diameter cylindrical section 38a carries a mounting flange 38d which terminates in an inwardly directed lip 38e, with the lip 38e being sized in relation to the outer diameter of the cylindrical section 36a to provide a force fit thereagainst. In a preferred form of the invention, the inner guide member 38 including the mounting flange 38d and lip 38e are fabricated of a conventional polyethylene which, coupled with the friction fit described, provides a tight seal against the more rigid edge portion of cylindrical section 36a. This seal is supplemented by the provision of an annular sealing gasket 48 which bears against the adjacent end of cylindrical section 36a when guide member 38 is assembled within inner drum body 36.

Extending lengthwise through the inner guide member 38 is a spiral or helical feeder 38f which is pitched in a direction to advance food products from the input end 38g of the guide member 38 to the output end 38h thereof in response to counterclockwise rotation of the entire drum assembly.

Mounting of the inner guide member 38 within the inner drum body 36 is achieved by axially inserting the guide member 38 into the drum body 36, with the drum body 36 being provided with a plurality of radially and inwardly extending mounting ribs. One such rib is marked 36h, and the other similar ribs are provided at space circumferential locations about cylindrical section 36a (see FIG. 5). Ribs 36h not only serve to mount the guide member 38 within the inner drum body 36 but additionally serve to compartmentalize the annular batter reservoir 46 such that in response to rotation of the entire drum assembly, the batter will be carried upwardly (in the counterclockwise direction as seen in FIG. 5) to pour over and cover all surfaces of the food product being fed through the battering unit 34.

Now considering the breading unit 40 and with particular reference to FIG. 3, the outer drum body 42 is seen to include a cylindrical section 42a which is open at its front end 42b and has an end wall 42c at the end opposite the open front 42b. Projecting outwardly from the periphery of the cylindrical section 42a are guide flanges 42d, 42e which are seen in FIG. 2 to be spaced in relation to each other to engage outwardly of idler rollers 22, 24 and drive rollers 26, 28 to confine the drum 42 on the drive cradle.

As seen best in FIGS. 3 and 4, the drum further includes inwardly-directed circumferentially-extending partition flanges 42f, 42g which, in conjunction with the outer guide member 44 (see FIG. 4) divide the space therebetween into three compartments arranged along the length of the drum 42 including a dropping compartment or section 50 between the end wall 42c and the partition flange 42g, a breading compartment or section 52 between the partition flanges 42g, 42f and a breader-stripping or reclaiming compartment or section 54 arranged intermediate the partition flange 42f and the front end of the machine. Access to the dripping section 50 is achieved through a trap door opening 42h which is closed by a sliding door 42i while access to the breading section 52 is achieved through trap door opening 42j which is closed by sliding door 42k (see FIG. 4).

As seen best in FIG. 3, the partition flange 42f between the breading section 52 and the reclaiming section 54 is interrupted at spaced circumferential locations by several cutouts 42l which are provided on the trailing edge thereof with scoped veins 42m which serve, in response to the rotation of the drum to redirect bread crumbs reclaimed in section 54 back into the breading section 52.

Mounting of the outer guide member 44 within the outer drum body 42 is achieved by axially inserting a guide member 44 into the drum body 42, with the drum body 42 being provided with the plurality of radially and inwardly extending mounting ribs. One such rib is marked 42m; and other similar ribs are provided at spaced locations about cylindrical section 42a (see FIG. 5). Ribs 42m not only serve to mount the guide member 44 within the outer drum body 42, but additionally serve to compartmentalize the angular breading compartment or reservoir such that in response to rotation of the entire drum assembly, the breading will be carried upwardly (in the counterclockwise direction as seen in FIG. 5) to pour over and cover all surfaces of the food product being fed through the breading unit 40.

With continued reference to FIG. 3, the outer guide member 44 is seen to include a cylindrical section 44a which is of a length to be substantially coextensive with the breading compartment 52 and the reclaiming compartment 54, and intermediate perforated section 44b which includes a cylindrical segment and a conical segment, the juncture of the cylindrical and conical sections being arranged substantially in a common transverse plane with partition flange 42g (see FIG. 4) and a conical section 44c which is perforated and is substantially coextensive with the dripping compartment 50. Near its free end the cylindrical section 44a carries a mountaing flange 44d which terminates in an inwardly directed lip 44e, with the lip 44e being sized in relation to the outer diameter of the cylindrical section 42a to provide a force fit thereagainst. In a preferred form of the invention the entire outer guide member 44 including its mounting flange 44d and lip 44e are fabricated of a conventional polyethylene, which, coupled with the friction fit described, provides a tight seal against a more rigid edge portion of cylindrical section 42a. If desired, this seal could be supplemented by provision of an angular sealing gasket comparable to gasket 48.

The imperforate intermediate section 44b of the outer guide member 44 which dissects the partition 42g assists in separating the drip cmpartment or section 50 from the breading compartment or section 52.

Extending lengthwise in the outer guide member 44 is a spiral or helical feeder 44f which is pitched in the direction to advance the battered food products from the input end 44g of the guide member to the output end 44h thereof in response to counterclockwise rotation of the entire drum assembly. The direction of movement of the food product through the breading unit 40 is seen to be opposite from that through the battering unit with movement through the battering unit being from right to left in the illustrations of FIGS. 3 and 4 and through the breading unit from left to right.

Additionally, it may be desirable to supplement the releasable securement of the outer guide member 44 within the outer drum 42, this being achieved by the provision at spaced locations about the circumferential extent of lip 44e of bayonet slots 44i which receive bayonet pins 42n provided at the corresponding locations about the drum 42. Similar bayonet arrangements may be provided between the inner guide member 38 and inner drum body 36, as seen in FIG. 2.

In order to impart a tumbling motion to the food product as it passes through the breading unit, and in particular through the section confronting the breading compartment 52, there is provided at spaced circumferential locations about the feeder 44f a plurality of inwardly directed projections 44j which tend to tumble the food product as it is fed along by the feeder 44f. This tumbling motion coupled with the spill-over of the breading (see FIG. 5) assures that all surfaces of the food product will be exposed to the breading for complete and uniform coating thereof.

The battering unit 34 including inner drum body 36 and inner guide member 38 is mounted within the outer breading assembly comprising the outer drum body 42 and outer guide member 44 by axially inserting the unit 34 within the clearance space afforded by the inner diamter of the feeder 44f, as seen in FIG. 4, with provision being made for releasably attaching unit 34 within unit 40. This releasable attachment may take many forms including the provision of locking devices interconnected between the ribs 36d, 36e, 36f and the mounting flange 44d of outer guide member 44. A typical releasable attachment device includes a pin 56 mounted on the ribs 36d, 36e and 36f (see FIG. 1) which is received within a friction fit bore of a locking block 58 fixed to mounting flange 44d. In lieu of this, fitted bolts may be provided which releasably interengage the units.

Reference will now be made to FIGS. 1, 2, 4 and 5 for a description of a typical sequence of operations. At the outset, the breading compartment or section 52 is filled with the appropriate particulate coating material generally designated by the reference letter C and the batter reservoir 46 is filled with batter generally designated by the reference letter B to the level above cylindrical section 38a, but below smaller diameter cylindrical section 38c. The motor 32 of the combined base and drum drive 14 is energized whereupon the drum assembly including the four concentric members 36, 38, 42, 44 making up the battering unit 34 and the breading unit 40 rotate in the counterclockwise direction when viewed from the front end of the machine (see FIG. 1). The operator then merely drops the food product, for example, chicken parts, into the input end 38g of the battering unit 34. Feeder 38f is then operable to advance the food product through the battering section which is substantially coextensive with the cylindrical walls 36a, 38a. The food product moves up the incline provided by the intermediate conical section 38b, rising above the level of the batter followed by the capital letter B and moves on to the smaller diameter cylindrical section 38c wherein some of the batter drains off the food product. The food product then egresses from the output end 38h of the battering unit 34 which output end is spaced from within the wall 42c of the drum and the corresponding end 44g of breading unit 40. The food product then is advanced by the oppositely directed helical feeder 44f through the conical section 44c of outer guide member 44 which is coextensive with the dripping compartment 50 and, as illustrated in FIG. 4 excess batter will drip off of the food product and accumulate in compartment 50. The food products fall under the influence of gravity from the output end 38h of the battering unit into the input end of the breading unit which free fall has a tendency to shake off excess battering material. The battered product has a sufficient residence time in the dripping section of the breading unit to assure that substantially all of the excess batter will drip off and the product then delivered into the breading section which extends to partition flanges 42g, 42f will be sufficiently drip-free, yet tacky to assure that the bread crumbs C will adhere to all surfaces thereof. As the food products pass through the breading section the projections 44j are effective to tumble the food product, which coupled with the lifting and spillover of the bread crumbs by the vanes 42m (see FIG. 5) assures that all surfaces of the food product will be coated. The food product then passes into the reclaiming section of the machine wherein excess breading falls into reclaiming chamber 54 from which it is returned to the breading chamber 52 by the scope vanes 42m, previously described. The battered and breaded product egresses from the exit port which is defined by the terminal portion of feeder 44f, output end 44h of guide member 44 and the circumferential cutaway of mounting flange 36c intermediate ribs 36f, 36e, (see FIG. 1). Preferably, the terminal portion of feeder 44f is shaped and bent such that when the food product reaches the terminal portion along the vertical center line of the unit the terminal portion deflects the battered and breaded pieces of the food product outwardly into an appropriate receptacle, conveyor or the like.

It will be appreciated that there has been provided in accordance with the present invention a highly compact and easily operated battering and breading machine which is capable of widespread commercial application, is easy to use and in use is substantially fool-proof. The processing of the food product is such that the food product moves through a battering zone while rotating such that all surfaces of the food product are coated, with the food product then moving beyond the battering zone into a dripping zone wherein excess batter drips off of the food product. The food product is dropped through a free fall to shake off and residual batter and then fed through a coating zone, with adequate separation being established between the final drip stage and the coating zone to assure that there will be substantially no excess batter introduced into the breading or coating zone. Thereupon the food product is advanced through the coating zone and after applying the coating it is sent through a final stage wherein any excess coating material is removed.

A latitude of modification, change and substitution is intended in the foregoing disclosure, and in some instances, certain features of the invention will be used without the corresponding use of other features. Accordingly, it is appropriate that the claims be construed broadly and in a manner consistent with the manner and scope of the present invention.

What we claim is:

1. A machine for coating food products comprising a rotary drum, means mounting said drum for rotation about a drum axis, said drum including a battering section, a first feeder for feeding food products through said battering section in one direction, a coating section arranged coaxially of said battering section, a second feeder for feeding food products through said coating section in the opposite direction and means for transferring the battered food products from said battering section to said coating section.

2. A machine according to claim 1 wherein said battering section includes an inner drum body and a foraminous inner guide member mounted therein, said inner drum body and inner guide member cooperating to define a batter reservoir therebetween, said first feeder being disposed within said inner guide member.

3. A machine according to claim 2 wherein said coating section includes an outer drum body and a foraminous outer guide member mounted therein, said outer drum body and outer guide member cooperating to define a coating reservoir therebetween, said second feeder being disposed within said outer guide member.

4. A machine according to claim 3 wherein each of said first and second feeders is in the form of a helix.

5. A machine according to claim 4 wherein the helix of said first feeder is pitched to feed the food product in one direction through said battering section and the helix of said second feeder is pitched to feed the food product in the opposite direction through said coating section.

6. A machine according to claim 1 wherein the transferring means and first feeder are constructed and arranged to permit the battered food product egressing from the battering section to fall freely into a pickup position relative to said second feeder.

7. A machine according to claim 6 including means defining a dripping section following said battering section and in advance of said coating section.

8. A machine for battering and then breading food products comprising a rotary drum including a battering unit and a breading unit arranged coaxially of said drum, each of said battering and breading units having an input end and an output end, the input end of said battering unit and the output end of said breading unit being arranged at the same end of said drum such that the feed of the food product and the delivery of the battered and breaded food product is at said same end of said drum, means mounting said drum for rotary movement about a drum axis and a drive for rotating said drum about said drum axis.

9. A machine according to claim 8 wherein said battering unit is arranged within said breading unit, the output end of said battering unit being disposed inwardly of the input end of said breading unit such that the battered food product will fall under the influence of gravity as it passes from the battering unit into the breading unit.

10. A machine according to claim 8 wherein said battering unit includes a battering section extending from the input end thereof to an intermediate location spaced from the output end thereof and a dripping section extending from said intermediate location to said output end.

11. A machine according to claim 10 including a feeder extending from the input end of said battering unit to the output end thereof for advancing food products successively through said battering and dripping sections.

12. A machine according to claim 11 wherein said feeder is in the form of a helix.

13. A machine according to claim 12 wherein said battering section includes an inner drum body and a foraminous inner guide member mounted therein, said inner drum body and inner guide member cooperating to define a batter reservoir therebetween and said feeder being disposed within said inner guide member.

14. A machine according to claim 13 including means in said batter reservoir for pouring the batter contained therein onto all surfaces of the food product as it passes through the battering section.

15. A machine according to claim 14 wherein said dripping section includes a conical extension of said inner guide member for lifting the food product above the level of the batter in the batter reservoir.

16. A machine according to claim 8 wherein said breading unit includes a dripping section extending from the input end thereof to an intermediate location spaced from the output end thereof and a breading section extending from said intermediate location to said output end.

17. A machine according to claim 16 wherein said breading unit includes a reclaiming section intermediate said breading section and said output end.

18. A machine according to claim 17 including means for transferring breading reclaimed in said reclaiming section back into said breading section.

19. A machine according to claim 17 including a feeder extending from the input end of said breading unit to the output end thereof for advancing food products successively through said dripping section, said breading section and said reclaiming section.

20. A machine according to claim 19 wherein said breading section includes an outer drum body and a foraminous guide member mounted therein, said outer drum body and outer guide member cooperating to define a breading reservoir therebetween, said feeder being disposed within said outer guide member.

21. A machine for coating food products comprising a rotary drum, means mounting and rotating said drum about a drum axis, said drum including a battering unit having battering and dripping sections in succession, a first feeder for feeding food products through said battering and dripping sections, said drum further including a breading unit arranged coaxially of said battering unit and having dripping and breading sections in succession, a second feeder for feeding food products through said dripping and breading sections and means for transferring the battered food products from said dripping section of said battering unit to said dripping section of said breading unit.

22. A machine according to claim 21 wherein said battering unit includes an inner drum body and a foraminous inner guide member mounted therein, said inner drum body and inner guide member cooperating to define a batter reservoir therebetween coextensive with said battering section, said first feeder being a helix disposed within said inner guide member.

23. A machine according to claim 22 including means in said batter reservoir for carrying the batter therein at least partially around the circumference of said drum to cause said batter to spill over onto food products being fed along said helix.

24. A machine according to claim 21 wherein said breading unit includes an outer drum body and a foraminous outer guide member mounted therein, said outer drum body and outer guide member cooperating to define a breading reservoir therebetween coextensive with said breading section, said second feeder being a helix disposed within said outer guide member.

25. A machine according to claim 24 including means in said outer guide member cooperating with the helix of said second feeder for imparting a tumbling motion to the battered food products as they pass through said breading section.

26. A machine according to claim 21 wherein said battering unit is arranged within said breading unit, the dripping section of said battering unit being disposed inwardly of the dripping section of said breading unit such that the battered food product will fall under the influence of gravity as it passes from the battering unit into the breading unit.

27. A machine for coating food products comprising a rotary drum, means mounting said drum for rotation about a drum axis, said drum including a battering section extending lengthwise thereof, a first feeder for feeding food products through said battering section, said drum further including a coating section extending lengthwise thereof, a second feeder for feeding food products through said coating section, said battering and coating sections being coaxial and being coextensive for a substantial portion of their respective lengths and means for transferring the battered food products from one end of said battering section to the adjacent end of said coating section.

28. A machine according to claim 27 wherein each of said first and second feeders is in the form of a helix.

29. A machine according to claim 28 wherein the helix of said first feeder is pitched to feed the food product in one direction through said battering section and the helix of said second feeder is pitched to feed the food product in the opposite direction through said coating section.

30. A machine according to claim 27 wherein the transferring means and first feeder are constructed and arranged to permit the battered food product egressing from the battering section to fall freely into a pickup position relative to said second feeder.

31. A machine according to claim 27 including means defining a dripping section following said battering section and in advance of said coating section.

32. A method of coating food products comprising the steps of feeding said food products through a battering zone in one direction while rotating said food products to coat substantially all surfaces thereof, passing said food products beyond said battering zone to a dripping zone wherein excess batter drips off of said food products, dropping said food products through a free-fall zone to shake off excess batter and then feeding the battered food products through a coating zone in the opposite direction while rotating the battered food products to apply a particulate coating thereto.

33. A method of coating food products comprising the steps of feeding said food products through a battering zone while rotating said food products to coat substantially all surfaces thereof, passing said food products beyond said battering zone in one direction to a dripping zone wherein excess batter drips off of said food products, dropping said food products through a free-fall zone to shake off excess batter and then feeding the battered food products in the opposite direction through a coating zone while rotating the battered food products to apply a particulate coating thereof.

References Cited

UNITED STATES PATENTS

| | | | |
|---|---|---|---|
| 1,391,604 | 9/1921 | Baumgard | 118—19 |
| 1,908,539 | 5/1933 | Quick | 118—16X |
| 2,659,339 | 11/1953 | Harrison | 118—16 |
| 2,731,942 | 1/1956 | Anderson | 118—16 |
| 3,208,856 | 9/1965 | Luker. | |
| 3,225,735 | 12/1965 | Arcabasso | 118—19 |
| 3,408,980 | 11/1968 | Benson | 118—418X |

TIM R. MILES, Primary Examiner

U.S. Cl. X.R.

99—169; 117—109; 118—16, 19, 28, 30